(12) United States Patent
Stanford

(10) Patent No.: US 7,504,744 B2
(45) Date of Patent: Mar. 17, 2009

(54) CLASSIFICATION MECHANISM IN SYSTEM FOR SUPPLYING POWER OVER COMMUNICATION LINK

(75) Inventor: Clayton Reynolds Stanford, Summerland, CA (US)

(73) Assignee: Linear Technology Corporation, Milpitas, CA (US)

( * ) Notice: Subject to any disclaimer, the term of this patent is extended or adjusted under 35 U.S.C. 154(b) by 370 days.

(21) Appl. No.: 11/375,578

(22) Filed: Mar. 15, 2006

(65) Prior Publication Data
US 2006/0259798 A1    Nov. 16, 2006

Related U.S. Application Data

(63) Continuation-in-part of application No. 11/079,487, filed on Mar. 15, 2005, now abandoned.

(51) Int. Cl.
*H01J 1/00* (2006.01)
(52) U.S. Cl. .................................................. 307/29
(58) Field of Classification Search ................. 307/29
See application file for complete search history.

(56) References Cited

U.S. PATENT DOCUMENTS

2003/0036819 A1    2/2003   Lehr et al.
2006/0077888 A1*   4/2006   Karam et al. ............. 370/216

FOREIGN PATENT DOCUMENTS

WO    WO 2005/036374 A1    4/2005
WO    WO 2005/036815 A1    4/2005

OTHER PUBLICATIONS

Galit Mendelson, "All You Need To Know About Power over Ethernet (PoE) and the IEEE 802.3af Standard," IEEE, Jun. 2004, XP002372480, pp. 7-19; figures 2-10, PowerDsine Proprietary Information.

Yair Darshan, "IEEE802.3poep Study Group Technical Aspects," IEEE, [Online], Jan. 1, 2005, pp. 1-9, XP002389252, Retrieved from the Internet: URL:http://www.ieee802.org/3/poep_study/public/jan05/darshan_2_0105.pdf> [retrieved on Jul. 7, 2006].

IEEE Computer Society: "802.3af Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE STD 802.3AF-2003, Jun. 18, 2003, pp. 1-21, XP002323385 pp. 29-65, Institute of Electrical and Electronics Engineers, Inc.

International Preliminary Report on Patentability and Written Opinion of The International Searching Authority issued in International Application No. PCT/US2006/009186, dated Sep. 27, 2007.

* cited by examiner

Primary Examiner—Robert L. DeBeradinis
(74) Attorney, Agent, or Firm—McDermott Will & Emery LLP

(57) ABSTRACT

System and methodology for providing classification of a load in a power supply system for providing power over a communication link. The power supply system has a classification engine for probing the load to determine a characteristic of the load. The classification engine supplies the load with multiple classification signals to determine multiple response signals presented by the load in response to the respective classification signals.

53 Claims, 4 Drawing Sheets

CLASSIFICATION MECHANISM IN SYSTEM FOR SUPPLYING POWER OVER COMMUNICATION LINK

This application is a continuation-in-part of U.S. patent application Ser. No. 11/079,487 filed on Mar. 15, 2005 now abandoned, and entitled "SYSTEM AND METHOD FOR SUPPORTING OPERATIONS OF ADVANCED POWER OVER ETHERNET SYSTEM."

TECHNICAL FIELD

This disclosure relates to power supply systems, and more particularly, to system and methodology for performing classification of a load in a system for providing power over a communication link.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of operating in a classification mode to indicate how much power it will draw when powered up. In the classification mode, the PSE should provide classification voltage $V_{Class}$ between 15.5V and 20.5V. In response to the classification voltage, the PD may present classification current $I_{Class}$ representing the class of the PD. The PSE measures this current to determine the class of the PD.

This classification procedure is performed only once to determine a power requirement of the PD. In particular, a PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

However, it would be desirable to develop a novel classification mechanism that would support further PoE functions in addition to determining a class of a PD.

SUMMARY OF THE DISCLOSURE

The present disclosure offers a novel system and methodology for providing classification of a load supplied with power over a communication link.

In accordance with one aspect of the disclosure, a power supply system for providing power to the load includes a classification engine for probing the load to determine a characteristic of the load, for example, the power requirement of the load. The classification engine may supply the load with multiple classification probe signals to determine multiple response signals presented by the load in response to the respective classification signals.

The response signals from the load may represent any information to be transmitted from the load to the controller. In particular, successive response signals may have the same or different values with each probe as a method to communicate information.

The communication link may include an Ethernet cable. The classification engine may determine the class of the load via the Ethernet cable. To transmit information, the load may present different class information in response to successive classification probe signals.

In accordance with another aspect of the disclosure, a powered device for receiving power from a power supply device over a communication link comprises a classification engine for presenting a characteristic of the powered device in response to multiple classification signals provided by the power supply device. The classification engine may present multiple response signals in response to the multiple classification signals.

The response signals may represent any information to be transmitted by the powered device. In particular, the powered device may change a previously presented class in response to a predetermined condition.

In accordance with a further aspect of the disclosure, a system for supplying power to a load over a communication link includes a first wire set composed of two pairs of conductors, and a second wire set composed of other two pairs of conductors. The system comprises a first classification engine for probing the load over the first wire set to determine a first response of the load, and a second classification engine for probing the load over the second wire set to determine a second response of the load. For example, the first and second classification engines may determine a power requirement of the load.

The first classification engine may supply the load with at least one first classification signal over the first wire set to determine at least one first response signal from the load. Similarly, the second classification engine may supply the load with at least one second classification signal over the second wire set to determine at least one second response signal from the load. The first classification signal over the first wire set may be followed by the second classification signal over the second wire set. The response of the load to the first classification signal may differ from the response to the second classification signal.

Each of the first and second classification engines may be configured to supply the load with multiple classification signals and determine multiple response signals presented by the load in response to the respective classification signals.

A first power control mechanism may be provided for controlling power delivery over the first wire set, and a second power control mechanism may control power delivery over the second wire set. Power over the first or second wire set may be delivered based on a classification response over the first or second wire set. For example, power over a particular wire set may be established based on a classification response over the same wire set.

First and second detection engines may be provided for probing the first and second wire sets to detect whether the load is connected. The first and/or second classification engines may determine classification responses from the load after the respective detection engines detect the load.

Alternatively, the first detection engine may perform first detection of the load over the first wire set before a corruption signal is transferred to the load over the second wire set, and perform second detection of the load over the first wire set after the corruption signal is transferred. If a response of the load to the first detection differs from a response of the load to the second detection, the first detection engine may conclude that the both wire sets are connected to the same load.

In accordance with a further aspect of the disclosure, a powered device for receiving power from a power supply device over a communication link having first and second wire sets comprises a first classification engine for presenting a characteristic of the powered device in response to at least one request signal provided by the power supply device over the first wire set, and a second classification engine for presenting the characteristic of the powered device in response to at least one request signal provided by the power supply device over the second wire set. The first classification engine may present a different value than the second classification signal.

Each of the first and second classification engines may present multiple response signals in response to multiple request signals from the power supply device. Successive response signals may have different or the same values.

For example, each of the first and second classification engines may present different classes for the powered device in response to successive classification signals from the power supply device. The classification engines may change a previously presented class in response to a predetermined condition.

In accordance with a method of the present invention, the following steps are carried out to supply power to a load via communication cabling in a local area network having a plurality of nodes, a network hub and the communication cabling connecting the nodes to the network hub for providing data communications:

detecting the load linked to the communication cabling,
providing the load with a first classification signal to determine a characteristic of the load,
determining a first response from the load to the first classification signal,
providing the load with a second classification signal to determine the characteristic of the load, and
determining a second response from the load to the second classification signal. The second response may differ from the first response.

In accordance with another method of the present disclosure, the following steps are carried out for supplying power to a load over communication cabling having first and second wire sets, each of which is composed of two pairs of conductors, in a local area network having a plurality of nodes, a network hub and the communication cabling connecting the nodes to the network hub for providing data communications:

classifying the load over the first wire set to determine a characteristic of the load,
determining a first response from the load over the first wire set,
classifying the load over the second wire set to determine the characteristic of the load, and
determining a second response from the load over the second wire set. The second response may differ from the first response.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a PoE system having four pairs of conductors for supplying power from a PSE to a PD. It will become apparent, however, that the concepts described herein are applicable to any system for providing power to a load over a cable having two or more pairs of conductors. For example, the classification mechanism of the present disclosure may be used for classifying a load in a local area network (LAN) having a plurality of nodes, a network hub and communication cabling connecting the nodes to the network hub for providing data communications. The network hub may include a power supply device for supplying power to the load over the communication cabling.

Figure 1:
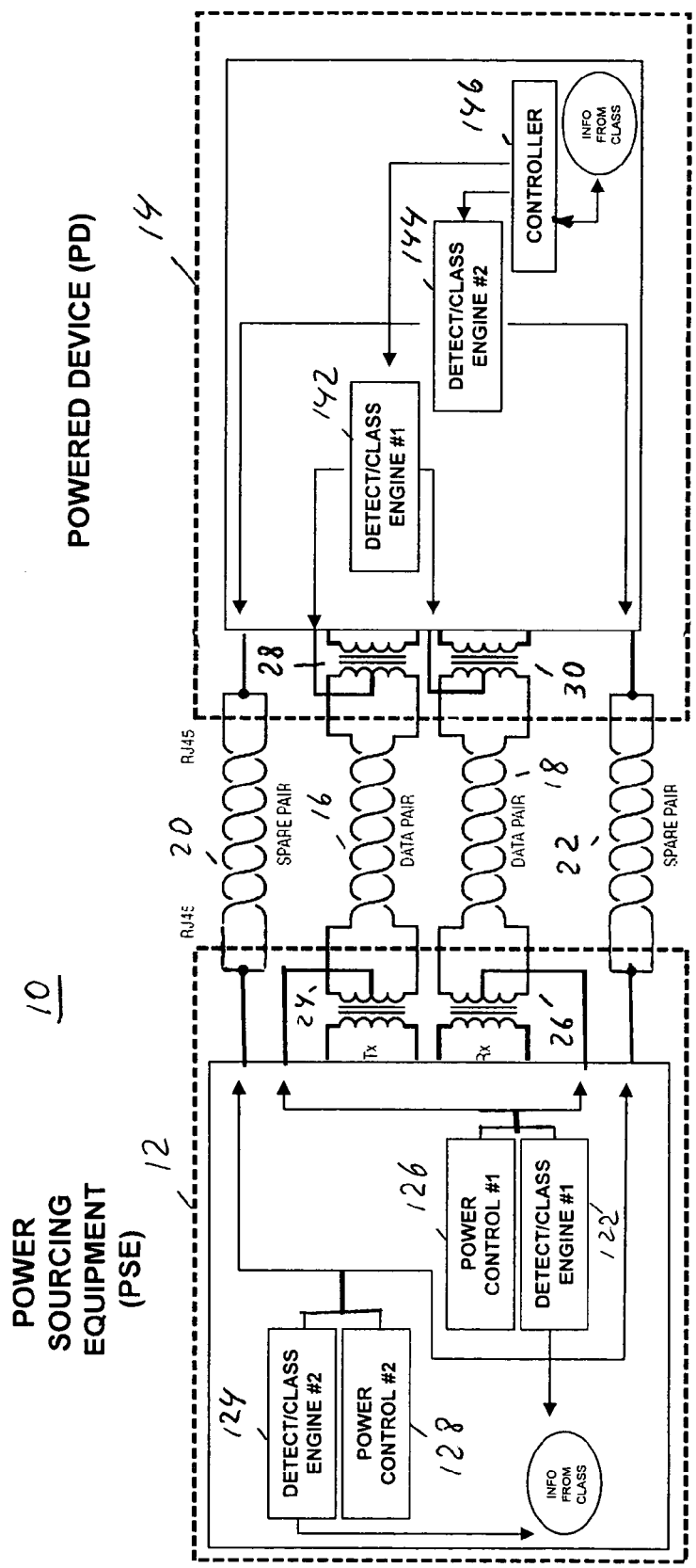
FIG. 1 is a diagram illustrating a PSE and a PD coupled over 4 pairs of conductors in a PoE system of the present disclosure.

FIG. 1 illustrates a PoE system 10 including a PSE 12 that provides power to a PD 14 over an Ethernet link segment having four twisted pairs of conductors combined into wire set 1 and wire set 2. For example, the wire set I may include data pairs 16 and 18, and the wire set 2 may include spare pairs 20 and 22. The data pairs 16 and 18 are respectively provided between data transformers 24 and 26 on the PSE side and data transformers 28 and 30 on the PD side. These data transformers may be used for connecting physical layer (PHY) devices involved in the Ethernet data transmission. An 8-wire Registered Jack 45 (RJ45) connector may be used for connecting the twisted pairs on the PSE and PD sides.

In accordance with the 802.3af standard, the PoE system 10 may support transferring power only over two pairs of conductors, either over the data pairs 16 and 18 or over the spare pairs 20 and 22. However, due to the resistance and associated heating of the Ethernet cabling system, only a limited amount of power may be delivered over 2 pairs of conductors.

Therefore, the PoE system 10 of the present disclosure is enabled to transfer power from the PSE 12 to the PD 14 over both data and spare pairs of conductors of the same Ethernet link segment simultaneously to reduce the cable system resistance. As a result, the PSE 12 may support high-power PDs requiring more power than available in accordance with the 802.3af standard. For example, a 48V DC voltage may be simultaneously applied from the PSE 12 to the data pairs 16 and 18, and the spare pairs 20 and 22 to deliver power over the both wire sets.

The PSE 12 and the PD 14 may participate in a PD detection procedure, during which the PSE 12 probes a link to detect the PD. If the PD is detected, the PSE 12 checks the PD detection signature to determine whether it is valid or non-valid. While the valid PD detection signature indicates that the PD is in a state where it will accept power, the non-valid PD detection signature indicates that the PD is in a state where it will not accept power.

If the signature is valid, the PD 14 has an option of presenting a classification signature to the PSE 12 to indicate how much power it will draw when powered up. For example, a PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD 14, the PSE 12 applies the required power to the PD 14.

The PoE system 10 may support detection and classification procedures performed either over the wire set 1 or over the wire set 2. Also, as discussed in more detail later, the detection and classification procedures may be carried out sequentially-first, over one of the wire sets and then, over the other wire set. In particular, the PSE 12 comprises a first detection/classification engine 122 for supporting detection and classification procedures over the wire set 1 including the data pairs 16 and 18, and a second detection/classification engine 124 for supporting detection and classification procedures over the wire set 2 including the spare pairs 20 and 22. Further, the PSE 12 includes a first power control mechanism 126 for controlling power delivery over the wire set 1, and a second power control mechanism 128 for controlling power delivery over the wire set 2.

The PD 14 comprises a first detection/classification engine 142 that interacts with the detection/classification engine 122 of the PSE 12 to carry out detection and classification procedures over the wire set 1, and a second detection/classification engine 144 that interacts with the detection/classification engine 124 of the PSE 12 to perform detection and classification procedures over the wire set 2. A controller 146 is provided for controlling the detection and classification engines 142 and 144.

Figures 2A, 2B:
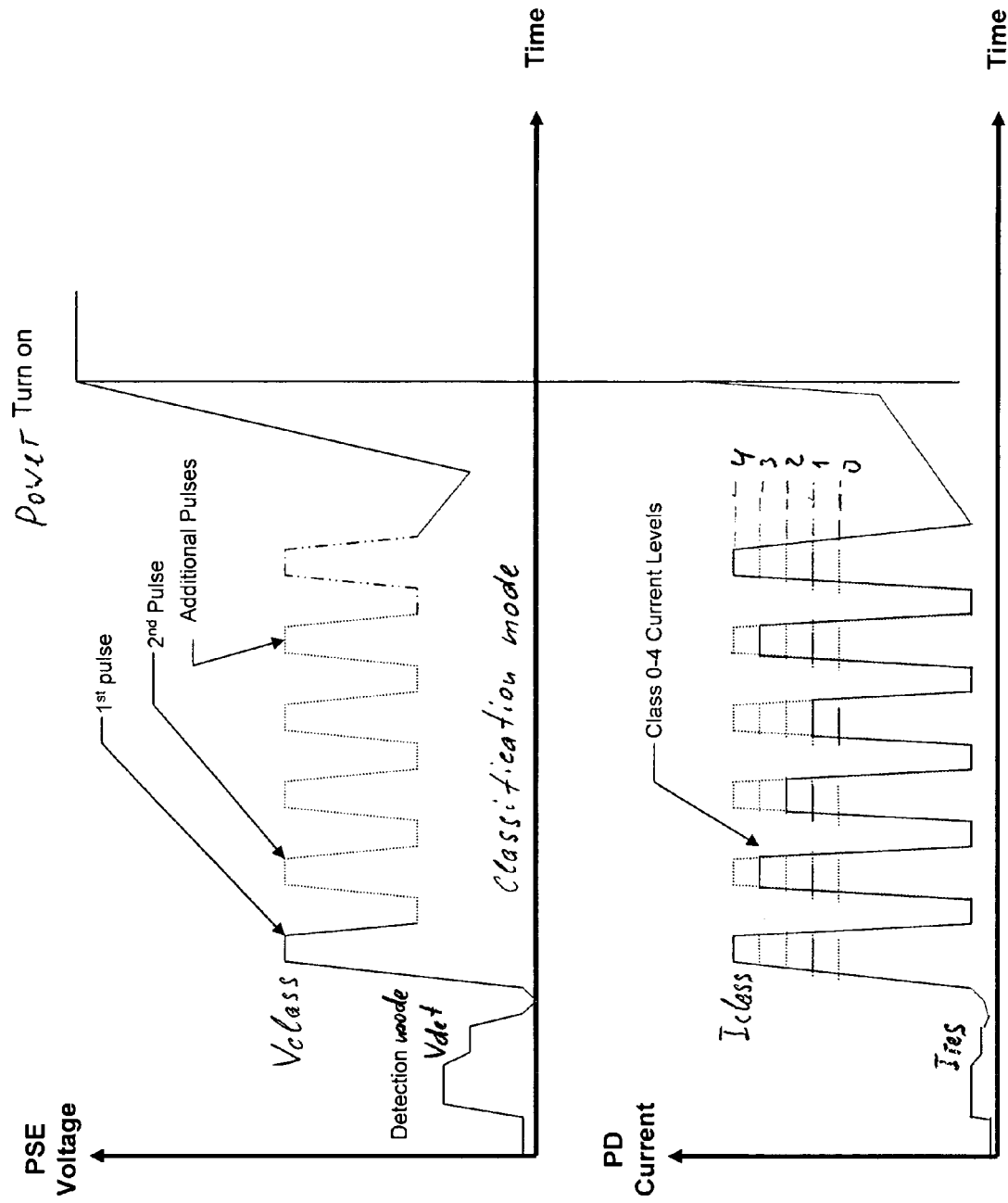
FIGS. 2A and 2B are waveforms illustrating PSE voltage and PD current during detection and classification procedures of the present disclosure.

FIG. 2A shows a timing diagram illustrating PSE voltage during the detection and classification procedures. FIG. 2B shows a timing diagram illustrating PD current produced in response to the PSE voltage. In particular, in a detection mode, the PSE 12 determines whether the wire set 1 and/or wire set 2 are connected to a valid PD. The respective detection/classification engine 122 or 124 performs detection over a selected wire set 1 or 2, by producing detection voltage Vdet applied via the selected wire set. The detection over one wire set may be followed by the detection over the other wire set to determine whether both wire sets are connected to the PD.

For example, the detection voltage Vdet may be in the range from 2.7V to 10.1V. Two or more tests may be performed by the detection/classification engine to detect signature resistance of the PD. For each test, the respective detection/classification engine of the PSE 12 produces the detection voltage Vdet. The minimum voltage difference between the detection voltages Vdet produced for different detection tests may be 1V.

Input voltage of the PD 14 corresponding to the detection voltage Vdet is applied to detection circuitry of the PD including signature resistance. The respective detection/classification engine of PSE 12 determines current Ires produced by the PD 14 in response to the applied detection voltage Vdet. The signature resistance of the PD is determined as $$R\text{signature} = \Delta V\text{det}/\Delta I\text{res},$$

where $\Delta V\text{det}$ is a difference between detection voltages in different tests, and $\Delta I\text{res}$ is a difference between currents produced in response to the respective detection voltages.

To be valid, the signature resistance should be in a predefined range. For example, for a PD compliant with the IEEE 802.3af standard, the signature resistance must be in the range from 23.75 KOhm to 26.25 KOhm.

If the detection/classification engine of the PSE 12 determines that the signature resistance is valid, a valid PD is deemed to be connected to the respective wire set. The detection procedure over one wire set may be followed by the similar detection procedure over the other wire set.

Alternatively, after detecting the PD over a first wire set, the PSE 12 may assert a corruption signal over a second wire set and repeat the detection procedure over the first wire set. If the signature resistance determined on the first wire set during the second detection differs from the signature resistance on the same wire set during the first detection, the PSE 12 concludes that the both wire sets are connected to the same PD. The corruption signal may be, for example, a voltage above the detection voltage range or any other signal that disturbs the normal detection mechanism.

After completing the detection mode, each detection/classification engine of the PSE 12 may switch into a classification mode. As discussed in more detail later, the classification procedure may be carried out over a selected wire set 1 or 2, or over the both wire sets 1 and 2. Via the wire set 1 and/or wire set 2, the first and/or second detection/classification engine of the PD 12 may apply a sequence of classification voltage pulses Vclass to the PD 14. For example, the voltage pulses Vclass may be in the range from 14.5V to 20.5V to satisfy the IEEE 802.3af requirements. The voltage pulses may have the same value, or may differ in their value. In response to each voltage pulse Vclass, the respective detection/classification engine of the PD 14 presents classification current Iclass. For example, in accordance with the IEEE 802.3af standard, the classification current for class 0 may be from 0 mA to 4 mA, the classification current for class 1 may be from 9 mA to 12 mA, the classification current for class 2 may be from 17 mA to 20 mA, the classification current for class 3 may be from 26 mA to 30 mA, and the classification current for class 4 may be from 36 mA to 44 mA.

Figure 3:
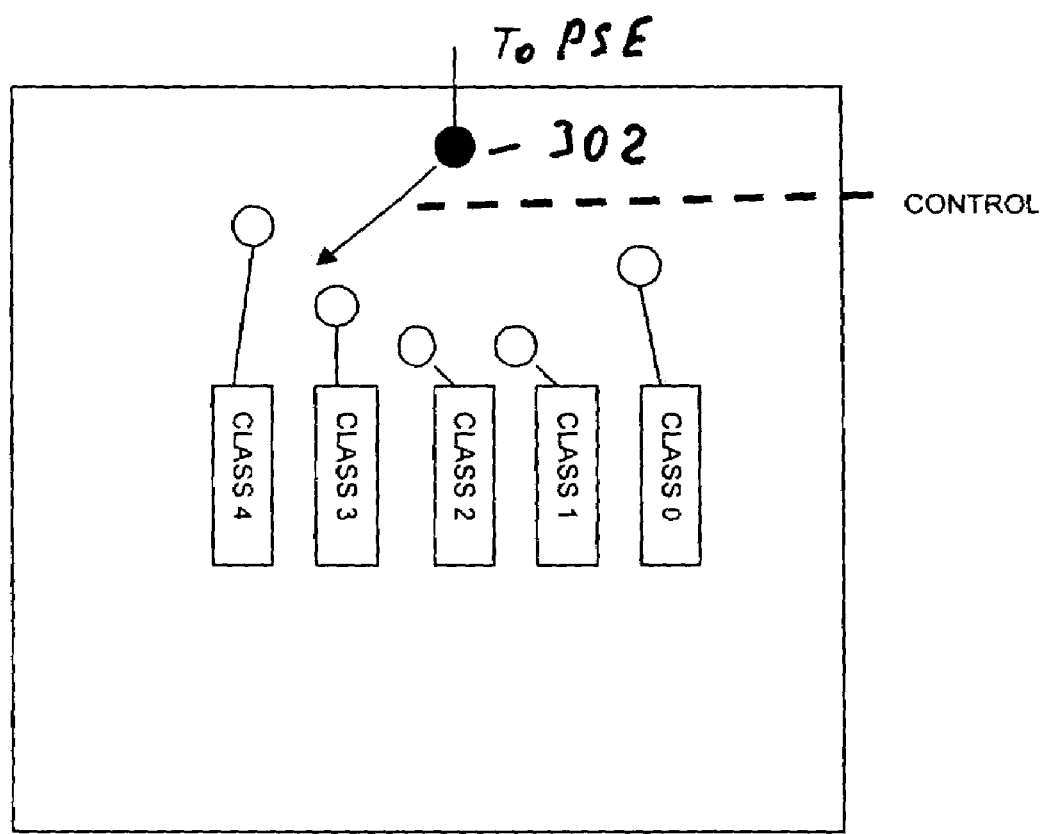
FIG. 3 is a diagram schematically illustrating a classification section of a detection/classification engine in the PD.

As schematically shown in FIG. 3, a classification section of each detection/classification engine 142 and 144 may include a selector 302 driven by the controller 146 (FIG. 1) to present a desired classification current level on the respective wire set. For example, the classification section may include a variable current source driven by the controller 146 to produce a desired level of the classification current for classes from 0 to 4. As shown in FIG. 2B, in response to each classification voltage pulse from the PSE 12, the controller 146 drives the selector 302 to present the classification current Iclass at a desired level from the class 0 current level to the class 4 current level. The desired level may be selected in accordance with a predetermined condition. The respective detection/classification engine of the PSE 12 measures a level of the classification current Iclass presented by the PD 14 in response to a particular classification voltage pulse Vclass.

The PD 14 may present different classification current levels in response to successive classification voltage pulses Vclass. Alternatively, the PD 14 may assert the same classification current level in response to the successive classification probes.

For example, a sequence representing various levels of the classification current Iclass asserted in response to a predetermined sequence of the classification voltage pulses Vclass may be used to carry information that the PD 14 desires to transmit to the PSE 12. The PSE 12 may produce any desired number of classification voltage pulses to enable the PD 14 to generate a desired number of information bits. The controller 146 of the PD 14 may access information to be transmitted, and encode it using multiple classification current levels. Based on the measured classification current levels, the respective detection/classification engine of the PSE 12 may decode the encoded information. Alternatively, information determined by the detection/classification engines 122 and 124 may be decoded by an information reception engine of the PSE (not shown). Although the present disclosure describes information presented by 5 current levels for classes 0 to 4, one skilled in the art would realize that any number of current levels may be used for encoding the transmitted information.

Further, although the present disclosure shows that each engine of the PSE 12 produces a classification signal including multiple voltage pulses, each engine may produce only a single classification voltage pulse in each classification procedure. In this case, the detection and classification procedure conducted over one wire set may be followed by the detection and classification procedures conducted over the other wire set. To transmit information, the PD 14 may present different levels of classification current in response to PSE voltage pulses applied over different wire sets.

Figure 4:
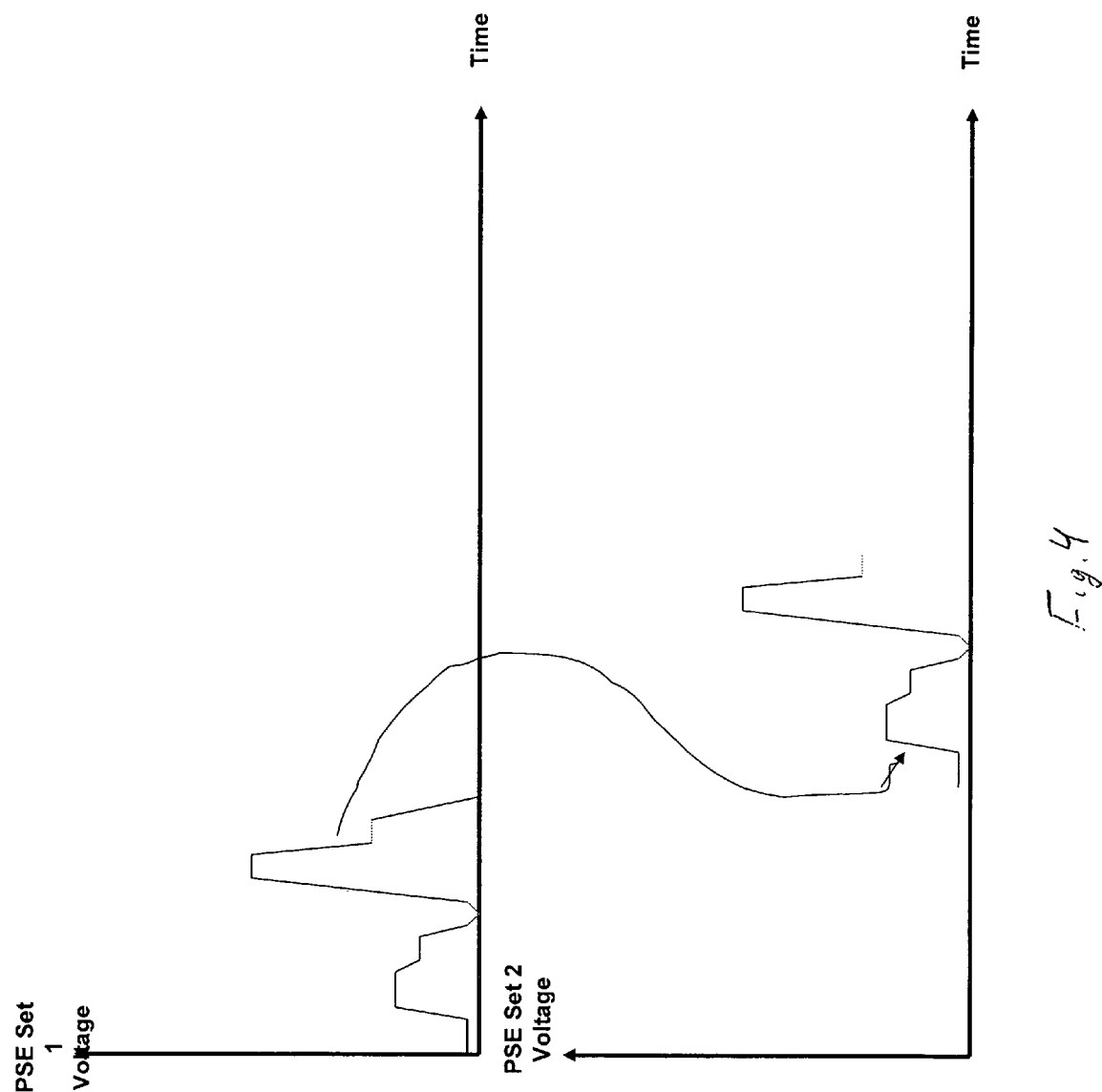
FIG. 4 is a timing diagram illustrating PSE voltage applied over first and second wire sets during detection and classification procedures of the present disclosure.

FIG. 4 illustrates the detection and classification procedures conducted over the both wire sets 1 and 2. After the detection/classification engine 122 applies detection voltages Vdet and one or more classification voltage pulses Vclass over the wire set 1, the classification engine 124 may apply detection voltages Vdet and one or more classification voltage pulses Vclass over the wire set 2. After presenting the detection signature on each wire set, the PD 14 may produce classification responses over the wire set 2 different from previously presented classification responses over the wire set 1.

Accordingly, the PD 14 may change its class presented on the wire set 1 and/or the wire set 2 in response to a predetermined condition. For example, the classification current Iclass measured by the PSE 12 may be controlled to present a desired class.

Further, the PSE 12 may repeatedly classify the same wire set to enable the PD 14 to transmit multiple bits of information over this wire set. For example, the PSE 12 may conduct the first classification probing over the wire set 1, for example, using a first classification voltage pulse. In response, the PD 14 presents a particular class, for example, using a respective classification current level. The PSE 12 may then conduct classification over the wire set 1 again, for example, using the next classification voltage pulse. In response, the PD 14 may maintain the class presented during the previous classification operation, or may change its class. The PSE 12 may repetitively classify the PD 14 to enable the PD 14 to transmit multiple bits of information to the PSE 12. The same procedure may be used on the wire set 2.

After the classification procedure, the power control mechanism 126 and/or the power control mechanism 128 may establish power over the wire set 1 and/or wire set 2. The power may be established based on the classification procedure conducted over any one of the wire sets or over the both wire sets.

For example, power to the wire set 1 may be established only using detection and classification conducted over the wire set 1, and power to the wire set 2 may be established only using detection and classification conducted over the wire set 2. Hence, each wire set is kept autonomous to enable the PSE 12 to deliver power to the PD 14 over 4 pairs of conductors using detection and classification methods conducted only over 2 pairs of conductors.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, detection and classification procedures of the present disclosure may be carried out in various manners enabling a PSE to detect and classify a PD.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power to a load over a communication link, comprising:
    a classification engine for probing the load to determine a characteristic of the load,
    the classification engine being configured for supplying the load with a sequence of classification signals to determine a response signal presented by the load in response to each classification signal in the sequence, the response signal providing information on a power requirement of the load.

2. The system of claim 1, wherein the classification engine is configured to determine a power requirement of the load.

3. The system of claim 1, wherein the response signals present information transmitted by the load.

4. The system of claim 1, wherein two successive response signals of the multiple response signals presented by the load have different values.

5. The system of claim 1, wherein two successive response signals of the multiple response signals presented by the load have the same value.

6. The system of claim 1, wherein the communication link includes an Ethernet cable.

7. The system of claim 6, wherein the classification engine is configured to supply the load with a first classification signal followed by a second classification signal.

8. The system of claim 7, wherein the classification engine is configured to determine first and second response signals presented by the load in response to the first and second classification signals, respectively.

9. The system of claim 8, wherein the first and second response signals present different classes of the load.

10. The system of claim 8, wherein the first and the second response signals present the same class of the load.

11. A powered device for receiving power from a power supply device over a communication link, comprising:
   a classification engine for presenting a characteristic of the powered device in response to a sequence of classification signals provided by the power supply device,
   the classification engine being configured for presenting a response signal in response to each classification signal in the sequence, the response signal providing information on a power requirement of the powered device.

12. The device of claim 11, wherein two successive response signals of the multiple response signals have different values.

13. The device of claim 11, wherein two successive response signals of the multiple response signals have the same value.

14. The device of claim 11, wherein the classification engine is configured to present a power requirement of the powered device.

15. The device of claim 11, wherein the response signals present information transmitted by the powered device.

16. The device of claim 11, wherein the communication link includes an Ethernet cable.

17. The device of claim 16, wherein the classification engine is configured to present two different classes of the powered device in response to two successive classification signals.

18. The device of claim 16, wherein the classification engine is configured to present the same class of the powered device in response to two successive classification signals.

19. A system for supplying power to a load over a communication link including a first wire set composed of two pairs of conductors, and a second wire set composed of other two pairs of conductors, the system comprising:
   a first classification engine for probing the load over the first wire set to determine a first response of the load, and
   a second classification engine for probing the load over the second wire set to determine a second response of the load.

20. The system of claim 19, wherein the first and second classification engines are configured to determine a power requirement of the load.

21. The system of claim 19, wherein the load is configured to transmit information to the system for supplying power.

22. The system of claim 19, wherein the first classification engine is configured for supplying the load with at least one first classification signal over the first wire set to determine at least one first response signal from the load, and the second classification engine is configured for supplying the load with at least one second classification signal over the second wire set to determine at least one second response signal from the load.

23. The system of claim 22, wherein each of the first and second classification engines is configured for supplying the load with multiple classification signals and determine multiple response signals presented by the load in response to the respective classification signals.

24. The system of claim 23, wherein the first and second classification engines are configured for supplying the first classification signal over the first wire set followed by the second classification signal over the second wire set.

25. The system of claim 23, wherein two successive response signals of the multiple response signals presented by the load have different values.

26. The system of claim 23, wherein two successive response signals of the multiple response signals presented by the load have the same value.

27. The system of claim 22, further comprising a first power control mechanism for controlling power delivery over the first wire set, and a second power control mechanism for controlling power delivery over the second wire set.

28. The system of claim 27, wherein the first power control mechanism is configured to deliver power over the first wire set based on a response of the load determined by the first classification engine over the first wire set, and the second power control mechanism is configured to deliver power over the second wire set based on a response of the load determined by the second classification engine over the second wire set.

29. The system of claim 27, wherein the first power control mechanism is configured to deliver power over the first wire set based on a response of the load determined by the second classification engine over the second wire set, and the second power control mechanism is configured to deliver power over the second wire set based on a response of the load determined by the first classification engine over the first wire set.

30. The system of claim 27, wherein the first and second power control mechanisms are configured to deliver power over the first and second wire sets based on a response of either the first or the second classification engine or a combination of both the first and the second classification engines over either the first or the second wire set or a combination of the first and second wire sets.

31. The system of claim 22, further comprising a first detection engine configured for probing the first wire set to detect that the load is connected to the first wire set and a second detection engine configured for probing the second wire set to detect that the load is connected to the second wire set.

32. The system of claim 31, wherein the first classification engine is configured to determine a response from the load over the first wire set after the first detection engine detects the load over the first wire set, and the second classification engine is configured to determine a response from the load over the second wire set after the second detection engine detects the load over the second wire set.

33. The system of claim 31, wherein the first detection engine is configured to perform first detection of the load over the first wire set before a corruption signal is transferred to the load over the second wire set, and to perform second detection of the load over the first wire set after the corruption signal is transferred.

34. The system of claim 33, wherein the first detection engine is configured to determine that the both first and second wire sets are connected to the same load if a response of the load to the first detection differs from a response of the load to the second detection.

35. The system of claim 19, wherein the communication link comprises an Ethernet cable having the first and second wire sets.

36. The system of claim 35, wherein the first classification engine is configured to determine a class of the load over the first wire set and the second classification engine is configured to determine a class of the load over the second wire set.

37. A powered device for receiving power from a power supply device over a communication link including a first wire set composed of two pairs of conductors, and a second wire set composed of other two pairs of conductors, the powered device comprising:
- a first classification engine for presenting a characteristic of the powered device in response to at least one first classification signal provided by the power supply device over the first wire set, and
- a second classification engine for presenting the characteristic of the powered device in response to at least one second classification signal provided by the power supply device over the second wire set.

38. The device of claim 37, wherein each of the first and second classification engines is configured for presenting multiple response signals in response to multiple classification signals from the power supply device.

39. The device of claim 38, wherein two successive response signals of the multiple response signals have different values.

40. The device of claim 38, wherein two successive response signals of the multiple response signals have the same value.

41. The device of claim 37, wherein the first classification engine is configured to present a different value than the second classification engine in response to the first and second classification signals successively provided from the power supply device.

42. The device of claim 37, wherein the first classification engine is configured to present the same value as the second classification engine in response to the first and second classification signals successively provided from the power supply device.

43. The device of claim 37, wherein the communication link comprises an Ethernet cable having the first and second wire sets.

44. The device of claim 43, each of the first and second classification engines is configured to present different classes of the powered device in response to two successive classification signals from the power supply device.

45. The device of claim 43, wherein each of the first and second classification engines is configured to present the same class of the powered device in response to two successive classification signals from the power supply device.

46. The device of claim 43, wherein each of the first and second classification engines is configured to change a presented class in response to a predetermined condition.

47. The device of claim 43, wherein the second classification engine is configured to change a class presented over the second wire set after the first classification engine presented a class in response to a classification signal received over the first wire set.

48. In a local area network having a plurality of nodes, a network hub and communication cabling connecting the nodes to the network hub for providing data communications, a method of supplying power to the load over the communication cabling, comprising the steps of:
- detecting the load linked to the communication cabling,
- providing the load with a first classification signal to determine a characteristic of the load,
- determining a first response from the load to the first classification signal, the first response providmnn information on a power requirement of the load at a first time period,
- providing the load with a second classification signal to determine the characteristic of the load, and
- determining a second response from the load to the second classification signal, the second response providing information on a power requirement of the load at a second time period.

49. The method of claim 48, wherein the second response differs from the first response.

50. The method of claim 48, wherein the second response is the same as the first response.

51. In a local area network having a plurality of nodes, a network hub and communication cabling connecting the nodes to the network hub for providing data communications, the communication cabling having a first wire set composed of two pairs of conductors and a second wire set composed of other two pairs of conductors, a method of supplying power to the load over the communication cabling, comprising the steps of:
- classifying the load over the first wire set to determine a characteristic of the load,
- determining a first response from the load over the first wire set,
- classifying the load over the second wire set to determine the characteristic of the load, and
- determining a second response from the load over the second wire set.

52. The method of claim 51, wherein the second response differs from the first response.

53. The method of claim 51, wherein the second response is the same as the first response.

* * * * *

UNITED STATES PATENT AND TRADEMARK OFFICE
CERTIFICATE OF CORRECTION

PATENT NO. : 7,504,744 B2
APPLICATION NO. : 11/375578
DATED : March 17, 2009
INVENTOR(S) : Clayton Reynolds Stanford Page 1 of 1

It is certified that error appears in the above-identified patent and that said Letters Patent is hereby corrected as shown below:

In the claims, at col. 12, lines 14-17,

"determining a first response from the load to the first classification signal, the first response providmnn information on a power requirement of the load at a first time period,"

should read

--"determining a first response from the load to the first classification signal, the first response providing information on a power requirement of the load at a first time period,"--

Signed and Sealed this
Seventh Day of June, 2016

Michelle K. Lee
*Director of the United States Patent and Trademark Office*